United States Patent
Vaswani et al.

(10) Patent No.: US 7,962,101 B2
(45) Date of Patent: Jun. 14, 2011

(54) METHOD AND SYSTEM FOR PROVIDING A ROUTING PROTOCOL FOR WIRELESS NETWORKS

(75) Inventors: Raj Vaswani, Portola Valley, CA (US); Daniel McKernan, Cupertino, CA (US); William San Filippo, III, Half Moon Bay, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 1041 days.

(21) Appl. No.: 11/732,964

(22) Filed: Apr. 4, 2007

(65) Prior Publication Data
US 2008/0051036 A1 Feb. 28, 2008

Related U.S. Application Data

(63) Continuation-in-part of application No. 11/560,938, filed on Nov. 17, 2006, now Pat. No. 7,797,009.

(60) Provisional application No. 60/738,088, filed on Nov. 17, 2005.

(51) Int. Cl.
*H04B 17/00* (2006.01)
(52) U.S. Cl. ............... 455/67.11; 455/161.3; 455/158.3
(58) Field of Classification Search ............... 455/67.11, 455/161.3, 158.3
See application file for complete search history.

(56) References Cited

U.S. PATENT DOCUMENTS

| | | | |
|---|---|---|---|
| 5,115,433 A | 5/1992 | Baran et al. | |
| 5,130,987 A | 7/1992 | Flammer | |
| 5,453,977 A | 9/1995 | Flammer, III et al. | |
| 5,659,300 A | 8/1997 | Dresselhuys et al. | |
| 5,673,252 A | 9/1997 | Johnson et al. | |
| 6,044,062 A | 3/2000 | Brownrigg et al. | |
| 6,078,785 A | 6/2000 | Bush | |
| 6,246,677 B1 | 6/2001 | Nap et al. | |
| 6,249,516 B1 | 6/2001 | Brownrigg et al. | |

(Continued)

FOREIGN PATENT DOCUMENTS

EP 1 734 705 A2 12/2006
(Continued)

OTHER PUBLICATIONS

International Search Report and Written Opinion issued in corresponding PCT Application No. PCT/US2008/004277 dated Nov. 27, 2008.

(Continued)

*Primary Examiner* — Yuwen Pan
(74) *Attorney, Agent, or Firm* — Buchanan Ingersoll & Rooney PC

(57) ABSTRACT

A method and system for providing a network protocol for utility services are disclosed are disclosed. In one embodiment, a computer-implemented method determines whether a measured real signal strength differs from a an accepted real signal strength by a configurable control limit parameter. In the event the measured real signal strength exceeds either an upper or lower bound based upon the configurable control limit parameter a determination is made whether there has been an unacceptable number of measured real signal strengths that exceed either an upper or lower bound based upon the configurable control limit parameter. In the event there has been an unacceptable number of measured real signal strengths that exceed either an upper or lower bound, which may include reaching or exceeding a configurable out of bound incidence limit, then a determination is made to calculate a new accepted real signal strength.

21 Claims, 10 Drawing Sheets

U.S. PATENT DOCUMENTS

| | | | |
|---|---|---|---|
| 6,473,614 B1* | 10/2002 | Quensel et al. | 455/436 |
| 6,538,577 B1 | 3/2003 | Ehrke et al. | |
| 6,590,928 B1 | 7/2003 | Haartsen | |
| 7,064,679 B2 | 6/2006 | Ehrke et al. | |
| 7,103,511 B2 | 9/2006 | Petite | |
| 7,277,027 B2 | 10/2007 | Ehrke et al. | |
| 7,477,466 B2* | 1/2009 | Yoshida et al. | 360/31 |
| 2003/0122686 A1 | 7/2003 | Ehrke et al. | |
| 2004/0203425 A1* | 10/2004 | Coffin, III | 455/67.11 |
| 2004/0213198 A1* | 10/2004 | Mahmood et al. | 370/349 |
| 2004/0218520 A1* | 11/2004 | Aizawa | 370/203 |
| 2005/0172024 A1 | 8/2005 | Cheifot et al. | |
| 2007/0120705 A1 | 5/2007 | Kiiskila et al. | |
| 2007/0274268 A1* | 11/2007 | Axelsson et al. | 370/338 |

FOREIGN PATENT DOCUMENTS

WO           2004/109474 A2     12/2004

OTHER PUBLICATIONS

Kahn, Robert E. et al., "Advances in Packet Radio Technology," Proc. of the IEEE, Nov. 1978, pp. 1468-1496, vol. 66, No. 11.

Kahn, Robert E., The Organization of Computer Resources into a Packet Radio Network, IEEE Transactions on Communications, Jan. 1977, pp. 169-178, vol. Com. 25, No. 1.

Jubin, John et al., "The DARPA Packet Radio Network Protocols," Proc. of the IEEE, Jan. 1987, pp. 21-32, vol. 75, No. 1.

Guthery, Scott, "Wireless Relay Networks," IEEE Network Magazine, Nov./Dec. 1997, pp. 46-51.

Johnson, David B., "Routing in Ad Hoc Networks of Mobile Hosts," Proc. of the IEEE Workshop on Mobile Computing Systems & Applns., Dec. 1994, pp. 158-163.

Johnson, David B. et al., "Dynamic Source Routing in Ad Hoc Wireless Networks," Mobile Computing, 1996, pp. 153-181, Chapter. 5, Kluwer Academic Publishers.

Johnson, David B. et al., "Protocols for Adaptive Wireless and Mobile Networking," IEEE Personal Communications, Feb. 1996, pp. 34-42, vol. 3, No. 1.

Estrin, Deborah, "Source Demand Routing: Packet Formt and Forwarding Specification," (version 1), Internet Draft, Jan. 1995, pp. 1-22.

Dube, Rohit et al., "Signal Stability-Based Adaptive Routing (SSA) for Ad Hoc Mobile Networks," IEEE Personal Communications, Feb. 1997, pp. 36-45, vol. 4, No. 1.

Toh, Chai-Keong, "A Novel Distributed Routing Protocol To Support Ad-Hoc Mobile Computing," Proc. of the 15$^{th}$ Annual Int'l. Phoenix Conf. on Computers & Communications, Mar. 1996, pp. 480-486.

Clausen, T. et al., "Optimized Link State Routing Protocol (OLSR)," Project Hipercom, INRIA, Oct. 2003, pp. 1-67.

Asami, Shigeyuki et al., "Differential HELLO Technique for Multihop Wireless Network Routing Protocols in Dense Environments," IEICE Trans. Commun., Jan. 2005, vol. E88-B, No. 1.

Perkins, Charles E. et al., "Highly Dynamic Destination-Sequenced Distance-Vector Routing (DSDV) for Mobile Computers," Proc. of the SIG-COM '94 Conf. on Communications Architecture, Protocols & Applns., Aug. 1994, pp. 234-244.

Perkins, Charles E. et al., "Ad-hoc On-Demand Distance Vector Routing," Proc. of the second IEEE Workshop on Mobile Computing Systems and Applns., Feb. 1999, pp. 90-100, IEEE Computer Society.

Haas, Zygmunt J., "A New Routing Protocol for the Reconfigurable Wireless Networks," Proc. of the 6$^{th}$ Int'l. Conf. on Personal Communications, Oct. 1997, pp. 562-566, IEEE.

Ko, Young-Bae et al., "Location-Aided Routing (LAR) in mobile ad hoc networks," Proc. of the 4$^{th}$ Int'l. Conf. on Mobile Computing and Networking, Oct. 1998, pp. 66-75, ACM.

International Search Report dated Oct. 25, 2007 in corresponding International Application No. PCT/US06/6107, 3 pages.

Office Action from U.S. Patent and Trademark Office, dated Sep. 18, 2009, in related U.S. Appl. No. 11/560,938, 7 pages.

Kaashoek, M. Frans et al. "Group Communication in the Amoeba Distributed Operating System," Proc. of the 11th Int'l Conf. on Distributed Computing Systems, May 1991, pp. 222-230, IEEE.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Vers | PID |R|   TTL   |R|  CurOff |P|S|   Addr Cnt   |
+-+-+-+-+-+-+-+-+-+-+-+-+-+-+-+-+-+-+-+-+-+-+-+-+-+-+-+-+-+-+-+-+
|                      Source Address                           |
+-+-+-+-+-+-+-+-+-+-+-+-+-+-+-+-+-+-+-+-+-+-+-+-+-+-+-+-+-+-+-+-+
| Source Address (cont)   | Hop Address1 (when present) |
+-+-+-+-+-+-+-+-+-+-+-+-+-+-+-+-+-+-+-+-+-+-+-+-+-+-+-+-+-+-+-+-+
|    Hop1 Address (cont)    |
+-+-+-+-+-+-+-+-+-+-+-+-+-+-+-+-+-+-+-+-+-+-+-+-+-+-+-+-+-+-+-+-+
     ...
+-+-+-+-+-+-+-+-+-+-+-+-+-+-+-+-+-+-+-+-+-+-+-+-+-+-+-+-+-+-+-+-+
|                    Destination Address                        |
+-+-+-+-+-+-+-+-+-+-+-+-+-+-+-+-+-+-+-+-+-+-+-+-+-+-+-+-+-+-+-+-+
| Destination Address (cont) |
+-+-+-+-+-+-+-+-+-+-+-+-+-+-+-+-+
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers| Type |  Seq Number  |R| Hop Cnt |A| Resp Timer |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers| Type |  Seq Number   |    Reserved   |    GW Load    |
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers | Type |  Seq Number  | TXPwr |Res|PC|   GW Load          |
+-+-+-+-+-+-+-+-+-+-+-+-+-+-+-+-+-+-+-+-+-+-+-+-+-+-+-+-+-+-+-+-+
|Path1 Length | Path1 Metric |    Path1 Hop1 L2 Address          |
+-+-+-+-+-+-+-+-+-+-+-+-+-+-+-+-+-+-+-+-+-+-+-+-+-+-+-+-+-+-+-+-+
|         Path1 Hop1 L2 Address (cont)                           |
+-+-+-+-+-+-+-+-+-+-+-+-+-+-+-+-+-+-+-+-+-+-+-+-+-+-+-+-+-+-+-+-+
|                      Path1 Hop2 L2 Address                     |
+-+-+-+-+-+-+-+-+-+-+-+-+-+-+-+-+-+-+-+-+-+-+-+-+-+-+-+-+-+-+-+-+
| Path1 Hop2 L2 Address (cont) |...
+-+-+-+-+-+-+-+-+-+-+-+-+-+-+-+-+
...
+-+-+-+-+-+-+-+-+-+-+-+-+-+-+-+-+-+-+-+-+-+-+-+-+-+-+-+-+-+-+-+-+
| Optional configuration items ...
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers|Type |  Seq Number  |   Status    |   Reserved           |
+-+-+-+-+-+-+-+-+-+-+-+-+-+-+-+-+-+-+-+-+-+-+-+-+-+-+-+-+-+-+-+-+
```

METHOD AND SYSTEM FOR PROVIDING A ROUTING PROTOCOL FOR WIRELESS NETWORKS

The present application is a CIP application, and claims the benefit of and priority to U.S. patent application Ser. No. 11/560,938 entitled "Method and System for Providing a Network Protocol for Utility Services" and flied on Nov. 17, 2006, and is now patented as U.S. Pat. No. 7,797,009 which claims benefit of 60/738,088 on Nov. 17, 2005.

FIELD OF THE INVENTION

The field of the invention relates generally to networks and network-based computer systems, and to a method and system for providing routing and network protocols for network-based utility services.

BACKGROUND OF THE INVENTION

Automated Meter Reading (AMR) is part of the Advanced Meter Infrastructure (AMI) that is currently being deployed by Utility Companies. It is network-based, and is a more efficient and accurate method for utility metering data collection, compared to manual on-site meter-reading of electric, gas and water meters.

Various technologies are implemented in AMR/AMI. All implementations perform the tasks of interfacing with the meter to sense consumption, retrieving and communicating back the stored consumption data in the meter to a central site, and storing consumption data in a computer system at the central site. Wireless technologies are getting increasing acceptance in AMR/AMI networks.

Wireless implementations of AMR/AMI are differentiated by being either mobile data collection systems or fixed-wireless data collection networks. Fixed networks may be wireless or wireline. However, the real advantages are with systems based on fixed wireless networks. The distinctive advantages of fixed networks are brought about by the frequent (typically at least daily) consumption data collection, in comparison with mobile AMR systems, which deploy a radio equipped mobile van to drive around the neighborhoods periodically (once a month, for example) to collect meter data over short-range radios for billing purposes. Worth noting among these advantages are: flexibility of billing date; marketing tools such as time-of-use (TOU) rates, demand analysis and load profiling. These enable clearer market segmentation and more accurate forecasts for utility resource generation, and also serve the goal of energy conservation and efficient consumption. Additionally, the utilities benefit from maintenance tools such as outage management and immediate notification of utility resource leakage or account delinquency.

Several methods and systems for implementing fixed network data collection from a plurality of remote devices, such as utility meters, to a central location have been developed and introduced in the past years.

In a typical AMR/AMI network, the utility devices are fully electronic with data reading, data storing, and digital packet communications capabilities. The devices are all linked together in a wireless LAN configuration. In this configuration, each device is a network node. Each node can communicate with other nodes directly and with the Network Management System (NMS) server via relays and Gateways. Typically each node can communicate with more than one Gateway. In networks such as those offering AMR/AMI services, the Gateway acts as an "agent" for the nodes in the wireless network, and transfers the messages between itself, other nodes and the NMS. Similarly, NMS is typically located in an external wide area network (WAN) which may be the Internet or a commercial WAN. The NMS communicates with the nodes in the wireless LAN via the Gateways. Gateways can be passive bridges or active data routers/forwarders, depending on the type of network devices deployed and the applications.

Communications among the NMS, gateways and the nodes of an AMI/AMR network are packet-based, and generally utilize TCP/IP protocols. In some applications, non-TCP/IP protocols are used in the wireless network, and the gateway provides the protocol conversion to TCP/IP. Considerable prior art exists regarding routing of packets, packet architecture, security, etc., that are relevant to computer-based terrestrial and wireless LANs that connect many intelligent remote nodes. The networking technology of Silver Spring Networks is unique in the sense that it is based on a pure IPv6 end-to-end packet architecture, carried by a Layer-2 based wireless LAN routing algorithm.

In wireless network applications where there are a very large number of fixed nodes, the per-node link cost needs to be minimized, and a high bandwidth utilization factor (efficiency) needs to be realized. Utility meter reading and control is characterized by frequent and reliable low-data-rate communication involving a network of a very large number of densely packed nodes.

The innovation presented herein and its predecessor innovations (Dresselhuys, 1997, ref. 5; Nap, 2001, ref. 6; Ehrke, 2003, ref. 7; Ehrke, 2006, ref. 8; Kiiskila, 2007, ref. 9), practiced by Silver Spring Networks, are unique and more efficient than other competing solutions in meeting the requirements of AMR/AMI.

There are many different network and data-link protocols used by ad hoc wireless LANs that are part of utility services networks (AMR, AMI, Smart-Grid, Demand Management, and others). Some of the early ones were developed for use with DSSS-based (Direct-Sequence Spread Spectrum) wireless networks (Dressethuys, 1997, ref. 5; Nap, 2001, ref. 6). The networking described in this Disclosure supports the transfer of commodity utilization data over a two-way spread spectrum wireless local area network to a gateway node connected to a two-way fixed wide area network or connected directly to the utility over a commercially available two-way data communications network (wireline or wireless). An optimized, hop-by-hop, packet routing algorithm is disclosed in these inventions (Dressethuys, 1997, ref. 5; Nap, 2001, ref. 6). The disclosed packet-routing algorithm has evolved (Ehrke, 2006, ref. 8; Kiiskila, 2007 ref. 9), to not require extensive route rediscoveries and routing tables, and it is based on an intelligent next-hop routing scheme. It has worked well in both DSSS and FHSS wireless networks. The algorithm is distinctly different from source routing techniques which take a fundamentally different approach in making packet routing decisions.

Technology and methods for routing of packets in the wireless networks and the Internet have been in constant state of evolution since the days of DARPA packet radio project (Kahn, 1978, ref. 1a). Several packet transmission data formats were evaluated and tested under the DARPA project (Kahn, 1977, ref. 1b), and they became the foundation for the Internet packet routing protocols. Some of the issues surrounding routing information management, etc., as a follow-on of the DARPA project are also well documented (Wescott, 1982, ref. 2; Jubin, 1987, ref. 3). With the advent of the Internet and TCP/IP packet protocols, considerable research has taken place in the areas of terrestrial, fixed wireless, and mobile wireless LANs (Lauer, 1995, ref. 4).

Many routing algorithms, as discussed later, are based on source-routing technique, where the node initiating the packet will provide a route to the destination for the packets to traverse, utilizing the best routing information from its memory. The route is computed regularly and distributed to all nodes by a central node. Local node discoveries are regularly done at the expense of vast network resources to keep routing data current. These techniques are fundamentally different from the dynamic techniques embodied by the invention disclosed here and in its predecessor patents.

There have been some improvements over the basic source routing technique. One of them is the Dynamic Source Routing Protocol (DSR). The initial design of the DSR, including route discovery and route maintenance mechanisms, was first published in December 1994 (Johnson, 1994, ref. 11; Johnson, 1996, ref. 12). The design for routing of IP packets in ad hoc wireless networks based on DSR was submitted to IETFs Mobile Ad Hoc Networks Working Group (MANET) (Broch, 1999, ref. 13).

Initial motivation for the design of DSR came from the operation of the Address Resolution Protocol (ARP), used in the TCP/IP suite of protocols. ARP is used on Ethernet and other broadcast-capable media types of networks to find the link-layer MAC address of a node on the same subnet as the sender.

DSR is similar in approach to the source routing discovery mechanism used in IEEE 802 SRT bridge standard (Perlman, 1992, ref. 14). Related techniques have also been used in other systems including FLIP (Kaashoek, 1993, ref. 15a) and Source Demand Routing Protocol (SDRP) (Estrin, 1995, ref. 16). FLIP grew out of much earlier work on the Amoeba Distributed Operating System (Kaashoek, 1991, ref. 15b). FLIP has the same familiar disadvantages of limited scalability, high costs for broadcast, and the need to maintain extensive routing tables.

DSR allows nodes to discover and maintain source routes to arbitrary destinations in the ad-hoc network. Source routing can work without the need for up-to-date routing in the intermediate nodes through which the packets are forwarded, and it allows nodes forwarding or overhearing packets to cache the routing information in them for their own future use. DSR can operate on demand and scale automatically. However, DSR suffers from endless loops of rediscovery, route maintenance, unexpected link blockages, and other issues. DSR may be more suitable for mobile wireless nodes than for fixed wireless nodes with a limited number of variables; the present invention relates to fixed wireless nodes.

There are other protocols that have used techniques similar to the ones used in DSR. For example, the Signal Stability-based Adaptive Routing Protocol (SSARP) (Dube, 1997, ref. 17) and the Associativity Based Routing Protocol (ABR) (Toh, 1996, ref. 18) each discover routes on demand in a way similar to Route Discovery in DSR, but each attempts to select only long-lived links. ABR also adds overhead for the periodic beacon packets required to monitor link stability. The invention discussed here is distinctly different from the family of source routing protocols including DSR, SSARP, ABR and others, since it is dynamic with no need to maintain extensive routing tables or updates and it does not suffer from repeated route discovery loops.

Other routing protocols have evolved from the early days of packet networks. The Link State Protocol (and various versions of it) and the Distance Vector Protocol (DVP) are two major classes of routing protocols. The Disclosure of this invention and its predecessor patents have some features similar to DVP, but they include additional unique features.

The Link-State Protocol is performed by every node in the network. The basic concept of link-state routing is that every node receives a map of the connectivity of the network. Each node then independently calculates the best next hop from it for routing its packets by using only its local copy of the map and without communicating in any other way with any other node.

The OLSR (Optimized Link State Routing) Protocol (Clausen, 2003, ref. 19) uses the Multi-Point Relay (MPR) technique to reduce the flooding overhead with HELLO messages. The HELLO messages contain all of the adjacent node information, and are used to detect other nodes. The size and number of HELLO messages can increase in densely populated environments, thus causing significant bandwidth overhead and latency. Later improvements of OLSR introduced a compression technique for HELLO messages ("Differential Hello") (Asami, 2005, ref. 20), wherein redundancies in acknowledgements and information forecasts are eliminated. But there is no clear metric for link cost in this algorithm. Hence the current invention differs from OLSR by specifying clear link cost metrics and by reducing the overhead associated with HELLO messages.

Destination-Sequenced Distance Vector (DSDV) Protocol (Perkins, 1994, ref. 21) is a hop-by-hop destination path protocol. Each network node maintains a routing table that contains the next hop to any reachable destination as welt as the number of hops that will be required. Sequenced updates of routing tables are maintained at each node. But this algorithm as described by Perkins (ref. 21) suffers from a lack of metrics for the actual dynamic "link cost", heavy bandwidth requirements for route updates, and inflexible routing architecture. This deficiency is eliminated in the modified DSDV version that is the basis of the invention presented herein.

Ad Hoc On-Demand Distance Vector Routing Protocol (AODV) (Perkins, 1999, ref. 22) is a reactive protocol. This means that a node requests a route solely when it needs one and does not require that the nodes maintain destination-based routing information. It is implemented strictly as a Layer-3 protocol. AODV also suffers from scalability problems stemming from its high bandwidth utilization for full-scale on-demand route discovery. The invention discussed here differs from AODV by using a Layer-2 protocol, and by providing an efficient mechanism for route updates.

The Zone Routing Protocol (ZRP) (Haas, 1997, ref. 23) defines a routing zone around each individual node, with a periodic (proactive) protocol such as distance vector or link state for routing within a zone, and an on-demand protocol such as DSR for routing between zones. This technique increases processing overhead and latency. ZRP is a derivative of the "Friends" protocol used by amateur radio operators in the mid-80s, wherein the packet was source-routed to the vicinity ("Zone"), and all nodes within the Zone were required to have the knowledge and capability for terminal delivery of the packet. The invention discussed here is far more sophisticated than ZRP and related techniques since it requires far fewer network and memory resources and it is reliable.

The Location-Aided routing (LAR) (Ko, 1998, ref. 24) proposes an optimization to Route Discovery that uses the GPS-based location information to narrow the area of the network over which the Route Request packets must be propagated. Other techniques use only logical (topological) information (Castaneda, 1999, ref. 25).

Packet radio networks (Takagi et al., 1984, ref. 26) and Metricom's UtiliNet and Ricochet systems (Flammer, 1992, 1995, ref. 27) are examples of relay networks. But the underlying techniques used in UtiliNet and Ricochet are based on a geographic nodal position model where requirements of network connectivity are maintained at each active node. There are several techniques discussed in the Metricom approach about how a new node acquires packet routing information from its neighboring established nodes. A star network routing strategy that guarantees the throughput and forward progress is a strategy known as "nearest neighbor with forward progress (NFP)" (Chou, 1995, ref. 28). But these techniques are still lacking in a robust routing scheme with less overhead and operational loops, as identified in routing techniques that utilize DVRP (Distance vector Routing protocol). These deficiencies are addressed by the current invention.

Some solutions, including Ricochet, call for a complete network topology directory at each node. Resource-intensive solutions such as these are typically too expensive or too complex for applications such as the utility network applications (AMR, AMI, Smart-Grid, etc.). Relay-star routing is also implemented in multi-hop wireless networks (Ore, 1962, ref. 29). This has the property that the graph of the nodes, which are able to communicate directly (in both directions), is a rooted tree. The concentrator is the root of the network tree, and any two nodes are connected by a unique path. Protocols have been developed for relay-star wireless network nodes communicating on a single frequency (FDMA or TDMA). A wireless communications protocol which does not require nodal directories and works in a "relay star" configuration has also been in use. (Guthery, 1997, ref. 10). However, typical relay star routing techniques are prone to packet losses due to limited intelligence in the routing tree. The current invention does not suffer from this deficiency.

There have been other utility network routing techniques discussed for ad-hoc wireless network applications. One such technique, referred to herein as "Brownrigg and Wilson", (Brownrigg, 2000, 2001, ref. 30) claims to be an improvement over an earlier version utilized in the Metricom Ricochet Network Design. It inaccurately claims that a given radio modem (node) in the Ricochet technique will be in radio contact with only one transceiver of the network. The Brownrigg and Wilson technique claims to minimize the number of hops from the clients to the servers based on the theory that the fewer the number of hops, the better the performance of the network. This is not the case on many occasions in densely packed wireless networks with varying link conditions. There is no quality metric given by Brownrigg and Wilson for calculating the link cost.

The technique utilized in Brownrigg and Wilson is a source routing technique with underlying key features of the OSPF (Open Shortest Path First) Internet routing algorithm. It is distinctly different from routing protocols, such as the invention discussed here, which have Distance Vector Routing Protocol (DVRP) as the basis. Further, Brownrigg and Wilson is dependent on maintaining client link state across multiple nodes which is not a feature of DVRP-based techniques. Further, Brownrigg and Wilson specifies no metric for link cost other than path availability. It utilizes some improvements innovated by Metricom (Baran, 1992; Flammer, 1992; ref. 31) without noting the history of those innovations. In fact, Brownrigg and Wilson may not differ from the entire class of dynamic source routing techniques of Johnson and others described above; it uses very similar techniques.

The protocol described in this innovation, and its predecessor patents which are practiced by Silver Spring Networks, differ significantly from other routing protocols significantly in several areas. For example:

Packet forwarding in Brownrigg and Wilson is source-routed, whereas the innovation reported herein and its predecessor patents use hop by hop forwarding with pre-assessed link cost.

Brownrigg and Wilson uses hop count as the sole metric. The innovation reported herein and its predecessor patents use a combination of hop count, link quality, and latency in route advertisement metrics.

Brownrigg and Wilson assumes that all "internet servers" are the same, assuming they all have the same internet connectivity and there is no reason to prefer one server over another. The innovation reported herein and its predecessor patents allow the end point to discriminate between egress points and related Internet servers. Thus the current invention has intrinsic multi-homing capability In the innovation reported herein and its predecessor patents, routing decisions are based on best route to the target network not just on the closest egress point.

Brownrigg and Wilson depends on client link state (similar to OSPF), whereas the innovation reported herein and its predecessor patents use a variation of the Distance Vector Routing technique.

The innovation reported herein and its predecessor patents allow one to maintain and use multiple MAC addresses for the nodes within the network, providing capability for IPv6-based multicasting, any casting, and other features of IPv6.

There are other, less efficient techniques (Bush, 2000, ref. 32) used in utility networks, wherein a regional central station can access any node (monitor) in the network via a unique address and retrieve utility meter data. In this technique, the path from the central station to the destination node is multi-hop in both directions, and the path is sequentially updated or changed by the central station until it receives the response from the node. It is based on star architecture, and utilizes time-consuming response-based techniques. It is a form of the source routing star network solution. The current invention is distinctly different and far superior in performance for wireless utility network applications.

Another reference, Petite, describes a system for relaying data packets in a wireless network between remote devices (effectively, utility meters) and a monitoring network or system through a gateway. (Petite, 2006, ref. 33) A data message including a unique identifier is sent from the remote device, the data message including a unique identifier of the meter and sensor information on the product being metered. The network relays this data message until one remote device forwards the data message to a site controller or gateway. The site controller or gateway uses the unique identifier to send a message to a host computer over a WAN, the message including the meter and sensor information on the product being metered. This system is similar to prior systems from a host of other products practiced by the industry (CellNet, Whisper communications, SSN and others) for many years since 1995, including the technology and products of Silver Spring networks. These products have employed a host of similar techniques since 1994 to relay data messages having a unique identifier for the meter and information on the product that was metered. Further, these systems differ substantially from the routing and network protocols described in the current disclosure and its predecessor patents, and as implemented by Silver Spring Networks. The invention disclosed herein and its predecessor patents, and as implemented by Silver Spring Networks, are unique in the sense they practice IPv6 end-to-end packet architecture, and Layer-2 based hop-by-hop intelligent routing protocol.

Many of the known network routing techniques are some form of centrally computed, tree-based, source-routing distribution schemes. As such, they consume considerable network resources. In the invention presented herein, which is practiced by Silver Spring Networks, the routing protocol is designed to function efficiently in a severely bandwidth- and node memory-constrained environment. Additionally, it is the only end-to-end IPv6 system implementation in AMR/AMI.

The references discussed above are given below:

1. (a) Kahn, Robert E. et al., "Advances in Packet Radio Technology", Proceedings of the IEEE, vol 66, No 11, pp 1468-1496, November 1978; (b) Kahn, Robert E., "The Organization of Computer Resources in a Packet Radio Network", Proceedings of the IEEE, vol. Com-25, No. 1, pp. 169-178, January 1977
2. Wescott, J., "Issues in Distributed Routing for Mobile Packet Radio Networks", Proceedings of the IEEE Global Telecommunications Conference, 1982 (New York: IEEE Press, 1982, pp 233-238).
3. Jubin, John and Tornow, Janet, D., "The DARPA Packet Radio Network Protocols", Proceedings of the IEEE, vol 75, No 1, pp 21-32, January 1987.
4. Lauer, Gregory S., "Packet-Radio Routing" in *Routing in Communications Networks*, edited by Martha E. Steenstrup, chapter 11, pp 351-396, Prentice-Hall, Englewood Cliffs, N.J., 1995
5. Dresselhuys, Donn. R, et al., "Meter for Measuring Volumetric Consumption of a Commodity", U.S. Pat. No. 5,659,300, Innovatec (Silver Spring Networks), Aug. 19, 1997.
6. Nap, Kimbel A. et al., "Automatic Meter Reading Data Communication System", U.S. Pat. No. 6,246,677, Innovatec (Silver Spring Networks), Jun. 12, 2001.
7. Ehrke, Lance A., et al., "Electronic Electric Meter for Networked Meter Reading", U.S. Pat. No. 6,538,577, Silver Spring Networks, Mar. 25, 2003.
8. Ehrke, Lance A., et al., "Electronic Electric Meter for Networked Meter Reading", U.S. Pat. No. 7,064,679, Silver Spring Networks, Jun. 20, 2006.
9. Kiiskila, Marko, et al., "Method and System for Providing a network Protocol for Utility Services", U.S. Patent Application # 500180978A, Nov. 16, 2006.
10. Guthery, Scott., "Wireless Relay Networks", IEEE Network Magazine, pp 46-51, November 1997
11. Johnson, David B., "Routing in Ad-Hoc Networks of Mobile Hosts", Proceedings of the IEEE Workshop on Mobile Computing Systems and Applications, IEEE Computer Society, pp 158-163, December 1994.
12. Johnson, David B. and Maltz, David A.: (a) "Dynamic Source Routing in Ad-Hoc Wireless Networks", in Mobile Computing, edited by Tomasz Imielinski and Hank Korth, chapter 5, pp 153-181, Kluwer Academic Publishers, 1996; (b) "Protocols for Adaptive Wireless and Mobile Networking", IEEE Personal Communications, vol 3, No. 1, pp 34-42, February 1996.
13. Broch, Josh, Johnson, David B., Maltz, David B., "The Dynamic Source Routing Protocol for Mobile Ad-Hoc Networks", Draft-IETF-Manet-DSR-03.txt, October 1999.
14. Perlman, Radia., "Interconnections: Bridges and Routers", Addison-Wesley, Reading, Mass., 1992
15. Kaashoek, Frans M., (a) "FLIP: An Internet Protocol for Supporting Distributed Systems", ACM Transactions on Computer Systems, vol 11, No. 1, pp 73-106, February 1993; (b) Kaashoek, Frans M. &Tanenbaum, A. S., "Group Communication in the Amoeba Distributed Operating System", Proceedings of the 11th International Conference on Distributed Computing Systems, pp 222-230, May 1991.
16. Estrin, Deborah, "Source Demand Routing: Packet Format and Forwarding Specification (version 1)", Internet Draft, January 1995.
17. Dube, Rohit, "Signal Stability-Based Adaptive Routing (SSA) for Ad-Hoc Mobile Networks", IEEE Personal Communications, vol 4, No 1, pp 36-45, February 1997.
18. Toh, C.-K., "A Novel Distributed Routing Protocol to Support Ad-Hoc Mobile Computing", Proceedings of the Fifteenth Annual International Phoenix Conference on Computers and Communications, pp 480-486, March 1996.
19. Clausen, T. and Jacquet, P., "Optimized Link State Routing Protocol", Project Hipercom INRIA Rocquencourt, IETF text, May 2003.
20. Asami, Shigeyuki., et al., "Differential HELLO Technique for Multihop Wireless Network Routing Protocols in Dense Environments", IEEE Trans. Commun., vol. E88-B, No. 1, January 2005.
21. Perkins, Charles E., and Bhagwat, Pravin., "Highly Dynamic Destination-Sequenced Distance-Vector Routing (DSDV) for Mobile Computers, Proceedings of the SIG-COM '94 Conference on Communications Architecture, protocols and Applications, pp 234-244, August 1994.
22. Perkins, Charles E., "Ad-Hoc On-Demand Distance Vector Routing", Proceedings of the second IEEE Workshop on Mobile Computing Systems and Applications, IEEE Computer Society, pp 90-100, February 1999.
23. Haas, Zygmunt J., "A New Routing Protocol for the Reconfigurable Wireless Networks", Proceedings of the $6^{th}$ International Conference on Personal Communications, IEEE pp 562-566, October 1997.
24. Ko, Young-Bae., "Location-Aided Routing (LAR) in Mobile Ad-Hoc Networks", Proceedings of the $4^{th}$ International conference on Mobile Computing and Networking, ACM, pp 66-75, October 1998.
25. Castaneda, Robert. And Das, Samir R., "Query Location Techniques for On-Demand Routing Protocols in Ad-Hoc Networks", Proceedings of the $5^{th}$ International Conference on Mobile Computing and Networking, ACM, August 1999
26. Takagi et al., "Optimal Transmission Ranges for Randomly Distributed Packet Radio Terminals", IEEE Trans. Commun., vol. Com-32, No 4, pp 246-257, March 1984
27. Flammer, G. H. et al., (a) "Method for Routing Packets in a Packet Communication Network", U.S. Pat. No. 5,115,433, May 19, 1992; (b) "Method for Network Configuration via Third Party Query", U.S. Pat. No. 5,453,977, Sep. 26, 1995.
28. Chou, T. C. and Li. V. O. K., "Performance Analysis of Routing Strategies in a Multi-hop Packet Radio Network", Proc. GLOBECOM '84, Atlanta, Ga., vol 1, pp 487-492, Nov. 26, 1994.
29. Ore, O., "Theory of Graphs", American Mathematical Society, 1962
30. Brownrigg, Edwin B. and Wilson, Thomas, W., (a) "Wireless Network System and Method for Providing Same", U.S. Pat. No. 6,044,062, Mar. 28, 2000; (b) "Wireless Network Gateway and Method for Providing Same", U.S. Pat. No. 6,249,516, Jun. 19, 2001
31. (a) Baran, Paul. et al., "Method and System for Routing Packets in a Packet Communication Network", U.S. Pat. No. 5,115,433, May 19, 1992; (b) Flammer, George H., et al., "Method for Synchronizing a wide area network without global synchronizing", U.S. Pat. No. 5,130,987, Jul. 14, 1992

32. Bush, William E., "Demand Reporting of Electricity Consumption by Radio in Relays to a Base Station, and Demand Relays Wattmeters so reporting over a Wide Area", U.S. Pat. No. 6,078,785, Jun. 20, 2000

33. Petite, Thomas D., "Wireless Communication Networks for Providing Remote Monitoring of Devices", U.S. Pat. No. 7,103,511, Sep. 5, 2006

SUMMARY

A method and system is disclosed in this invention for providing optimized routing protocol as may be used in network systems such as utility network systems. In one embodiment, a computer-implemented method determines whether a measured real signal strength differs from a an accepted real signal strength by a configurable control limit parameter. In the event the measured real signal strength exceeds either an upper or lower bound based upon the configurable control limit parameter a determination is made whether there has been an unacceptable number of measured real signal strengths that exceeds either an upper or lower bound based upon the configurable control limit parameter. In the event there has been un unacceptable number of measured real signal strengths that exceeds either an upper or lower bound, which may include reaching or exceeding a configurable out of bound incidence limit, then a determination is made to calculate a new accepted real signal strength.

The new accepted RSSI may be the last measured real signal strength or may be calculated using multiple measured real signal strength. The new accepted real signal strength may be used in determining link cost and in determining routing information.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 3 illustrates an exemplary common link layer packet header, according to one embodiment;

FIG. 5 illustrates an exemplary hello message header, according to one embodiment;

FIG. 7 illustrates an exemplary node registration acknowledgement message, according to one embodiment;

FIG. 8 illustrates an exemplary route update message sent by gateway to update settings for a CPD node, according to one embodiment; and FIG. 9 illustrates an exemplary route update acknowledgement message, according to one embodiment.

DETAILED DESCRIPTION

Figure 1:
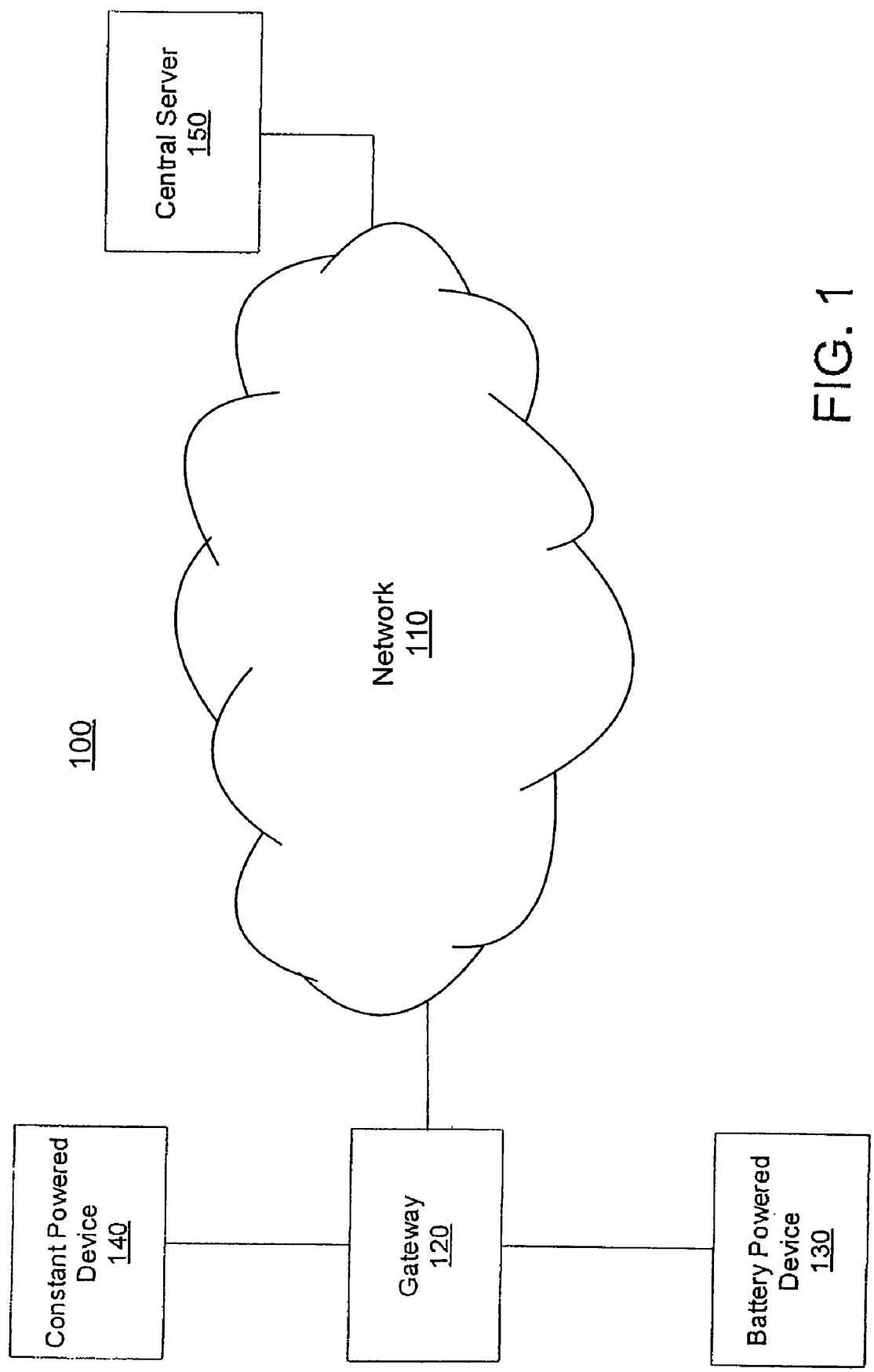
FIG. 1 illustrates a block diagram of an exemplary utility network, according to one embodiment of the present invention.

A method and system for providing a network protocol for utility services are disclosed. In one embodiment, a computer-implemented method comprises discovering a utility network, wherein a constant powered meter sends network discovery messages to find the utility network that it is a part of. Neighboring meters in the utility network are discovered, wherein the constant powered meter sends hello or status messages periodically. The constant powered meters are registered with the utility network. The constant powered meter sends a node registration message to a gateway. The gateway is the intermediate agent/central node in the network through whom a family of constant powered meters communicate with the central server of the utility network.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of serial and parallel steps leading to a desired result. The steps are those requiring manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, pixels, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specifically constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related or restricted to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram of an exemplary utility network 100, according to one embodiment of the present invention. Utility network 100 includes a data communications network 110, at least one gateway 120, at least one battery powered device (BPD) 130, and at least one constant powered device (CPD) 140. A centralized server 150 collects data from battery powered devices 130, and constant power devices 140. Data is communicated between nodes and server 150 in utility network 100 according to a network utility protocol.

Generally, the present network communication protocol is designed to operate in a dense multi-hop radio network, where nodes are fixed to a specific location. There is a central node (e.g., gateway 120) which plays a significant role in managing the network. BPD 130 and CPD 140 have very limited amounts of available memory and processing capabilities.

Gateway 120 is a central node which communicates with all of the other nodes, either directly or via relay. CPD 140 may be one or more meters and relays in the utility network 100. Meters are able to relay packets between other meters (CPDs 140 and BPDs 130), and between meters and the gateway 120. BPD 130 may be one or more battery powered meters and relays. They are limited in transmit power, uptime, and processing capabilities compared to CPDs 140. According to one embodiment, BPDs 130 are not able to relay packets. BPDs' 130 packets might be relayed by regular meters.

The topology of the network 100 is expected to change slowly. Nodes, such as BPDs 130 and CPDs 140 stay in the network for years, and the characteristics of a radio link between them changes quite slowly, except for transient noise sources and obstacles for RF propagation. The applications using network 100 are utility meter reading, management required for those meters, and management of other devices owned by utility companies.

Figure 2:
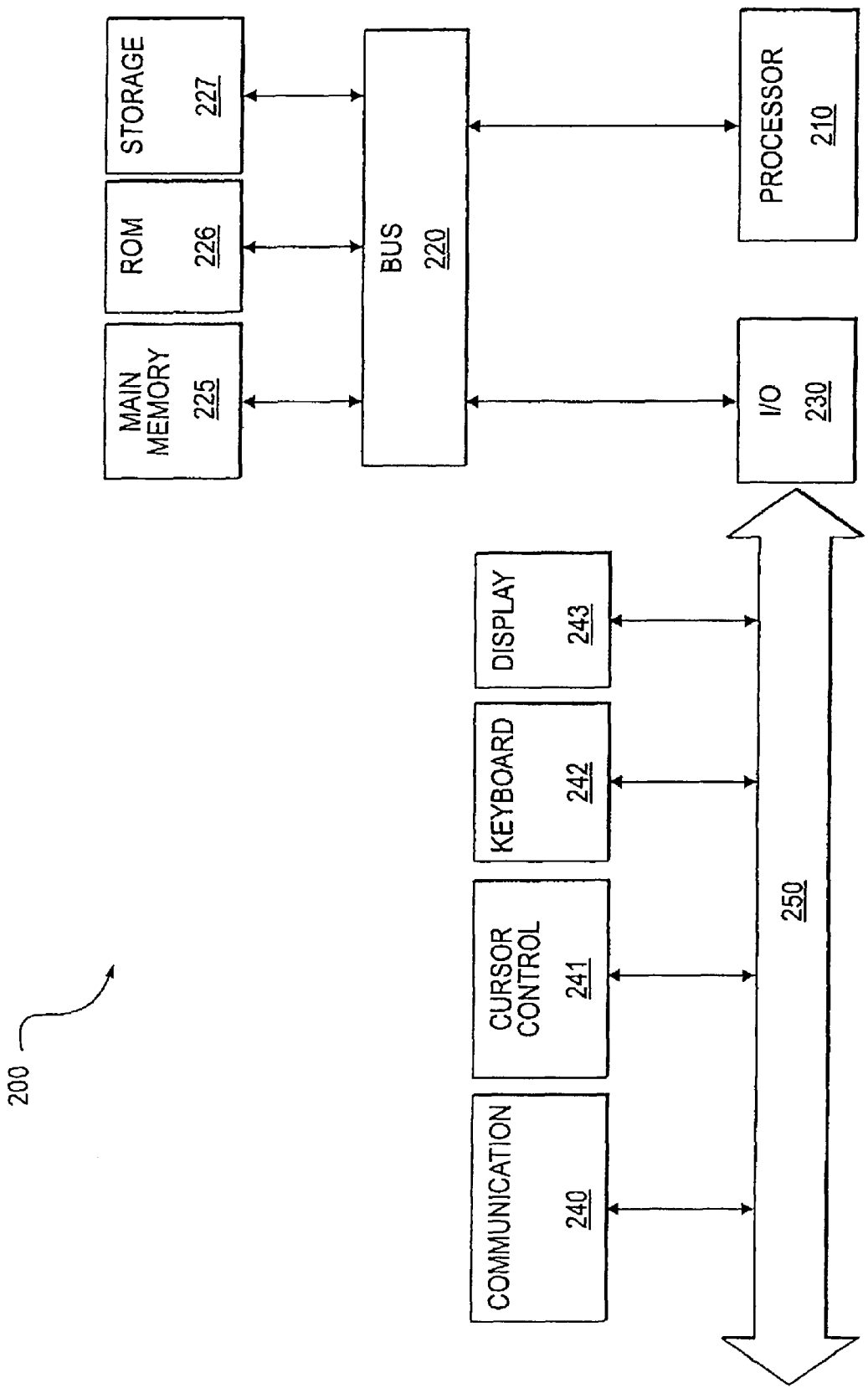
FIG. 2 illustrates an exemplary computer architecture for use with the present system, according to one embodiment of the invention.

FIG. 2 illustrates an exemplary computer architecture for use with the present system, according to one embodiment of the invention. Computer architecture 200 can be used to implement gateway 120, BPDs 130, CPDs 140 or a server 150 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241).

The communication device 240 allows for access to other computers (servers or clients) via a network. The communication device 240 may comprise a modem, a network interface card, a wireless network interface or other well known interface device, such as those used for coupling to Ethernet, token ring, straight IP, or other types of networks.

Overview

Nodes, such as BPDs 130 and CPDs 140, discover available networks (network 110), select one they should join, and then register themselves with the gateway 120. This central node gateway 120 keeps track of the network topology and capabilities of all devices in its control, and also other devices. Based on this info, it calculates, and distributes path and other state parameters to all registered devices, such as BPDs 130 and CPDs 140. Nodes maintain local state and the states of their immediate neighbors, and periodically send updates about their Local state to central node 120.

The central node 120 precomputes a set of routes and figures out which neighbours a particular node might talk with for the purpose of forwarding packets (rather than neighbour discovery). For each device 130, 140, the central node 120 calculates the packet transmit power setting and tries to minimize the amount of radio interference between neighbours. It distributes this state to all devices in the network, updating it when necessary. According to one embodiment IPv6 is used for the network layer protocol. Nodes 130, 140 registering with a central node 120 form a logical subnet and the central node 120 acts as a default router.

RF Link Layer

Link Layer Addressing

Each node 130, 140 is identified by a unique link layer address assigned to its radio interface. Typically each one has only a single interface. Gateways can have multiple interfaces, where each interface is dedicated to a separate channel. Link layer addresses are typically 6 bytes long. The Link Layer Broadcast address is in hex ff:ff:ff:ff:ff:ff (all ones). Packets destined to local broadcast are processed by everyone who receives them.

Link Layer Header

FIG. 3 illustrates an exemplary common link layer packet header 300, according to one embodiment. Link layer header 300 is contains the following fields:

| | |
|---|---|
| Vers | Version number. |
| PID | Protocol ID; identifier for the upper layer protocol. |
| R | Reserved |
| TTL | Time-to-live. |
| R | Reserved |
| CurOff | Current Offset; index to source address array identifying the location of the current hop. |
| P | Priority bit; 1 indicates high priority. |
| S | Source route bit; 1 indicates that source route follows. |
| Addr Cnt | Number of address elements which follows, set to 2 for packets without source routes. Will be >=2 for packets with source routes. |
| Source Address | Network address of the originator of the packet. This can never be the broadcast address. |
| Hop Address1 ... N | Addresses of intermediate hops for source routed messages. |
| Destination Address | Network address of the destination. This can be the broadcast address. |

Protocol ID—Protoid identifies the protocol that the packet is carrying. This may be a specific network protocol being used, or link layer routing protocol.

List of protocols with their ID values:
0x03: routing protocol,
0x04: IPv4 networking protocol,
0x06: IPv6 networking protocol,
0x07: Datalink trace.

TTL—This is set at each node 120, 130, where the packet is generated. The initial value is set to Default TTUL, and is configurable. The TTL is decremented on L2-fwd. [L2-pkt-out only if it has been through L2-fwd.]

Current Offset—This is set to 0 on packets which do not use source routes. This is set to 0 when the packet is first sent into the network. It is incremented when going through L2-fwd [L2-pkt-out after it has gone through L2-fwd].

Priority Bit—If the priority bit is set, high priority processing is requested for these messages. This maps to two levels of priority provided by the MAC/PHY layer.

Source Route Bit—Indicates whether the packet contains the entire hop-by-hop route to be used between source and destination.

Address Count—Indicates the total number of addresses contained in the data link header including the source, destination, and any intermediate addresses for source routed packets.

Source Address—This is the address of the node generating. According to one embodiment, it can not be set to the broadcast address.

Hop Addresses—This is the list of addresses for source routed messages. It can contain the broadcast address.

Destination Address—This is the address of the intended recipient of the packet. This can be the broadcast address.

Link Layer Forwarding—If the source route bit is set, the packet header contains the full path the packet will take. Note that a packet can be source routed between two nodes with no intermediate hops (i.e., AddrCnt is 2, and the destination address is either a node or broadcast address). This is a mechanism used to interrogate individual nodes 120, 140 from a terminal such as a debugging mobile station.

If the source route bit is not set, then the intended destination is the gateway 120, regardless of the destination address of the packet. For the case where the destination address is the broadcast address, the forwarding path is not entered because the packet is received locally. TTL gets decremented when a packet goes through a node's L2-fwd. Packets going through L2-fwd are dropped when TTL becomes zero. Messages with zero TTL destined to the local host are delivered up the stack. Nodes 130, 140 which are sending messages to the gateway 120 without using full source route set TTL to be at least the number of hops on the longest path they have leading to the gateway 120. The maximum TTL can be configured by the administrator. According to one embodiment, packets sent with the destination address set to L2 broadcast are not forwarded.

MAC Layer Behavior

Delivery of unicast packets is normally acknowledged by the MAC layer. Broadcasted packets are not acknowledged and it is possible to send unacknowledged unicast packets. When a node 130, 140 sends packets to a neighbour, the MAC layer reports the number of retries and the eventual success of the transmission. The network layer keeps counters of this information on a per neighbour basis.

Routing Subsystem

The routing subsystem is divided into 3 components:
network discovery
neighbour discovery and maintenance
node registration and route distribution
Network Discovery CPD 140 starts network discovery when:
it has not associated with a gateway,
if its communication links with its upstream neighbours have been severed,
if its periodic NREG message to gateway 120 fails to get acknowledged 3 times in a row.

BPDs 130 start network discovery if the link to its nominated master (CPD node 140) has been severed.

Channel Scan—when a node starts network discovery it sends two network discovery (ND) messages on a channel:
the first discovers network and give fast feedback about visibility of any network.
the second message is used in gathering a complete list of neighbours.

CPD node 140 searches for active networks by walking through all channels, while sending broadcasted network discovery (ND) messages and waiting for an acknowledgment. If CPD 140 receives such a message, it responds with a unicast acknowledgment within 'Fast ND Time'. These ND messages, and their acknowledgments are sent with max TX power setting. This first ND is sent with 'All flag' reset, if a node eavesdrops an acknowledgment coming from some other node, it will not send a 2nd acknowledgment. CPD 140 has the ability to move fast to next channel if this one is unused.

When CPD 140 discovers an active network it stops on that channel, and does a slower scan. This slower scan is done using another ND message with a longer response time, 'Slow ND Time', and will have 'All flag' set. This causes all the neighbors to respond. Out of all the neighbours on this channel, the best one is picked to represent the network. Goodness of network is determined by looking at info reported in acks, a node which minimizes the value from formula '(15−(RSSI_from_hello+RSSI_from_ack)/2)*4+# of hops*8+'gw_load' is chosen. 'gw_load' is value distributed by the gateway, and varies from 0->128, where 0 indicates least load. The CPD 140 walks through all channels, and gathers info about those networks. The walk of channels is done 3 times; the channels for which network info has been found are not visited again.

Based on the info collected from all channels, a network which minimizes the aforementioned value is elected. CPD 140 returns to this channel, and does a scan with a HELLO message in order to gather information about neighbors. Response timer in HELLO is set to 'Slow ND Time'. The list of neighbors is then sent in a node registration (NREG) message to the gateway 120.

Network Discovery Message Format

Figure 4:
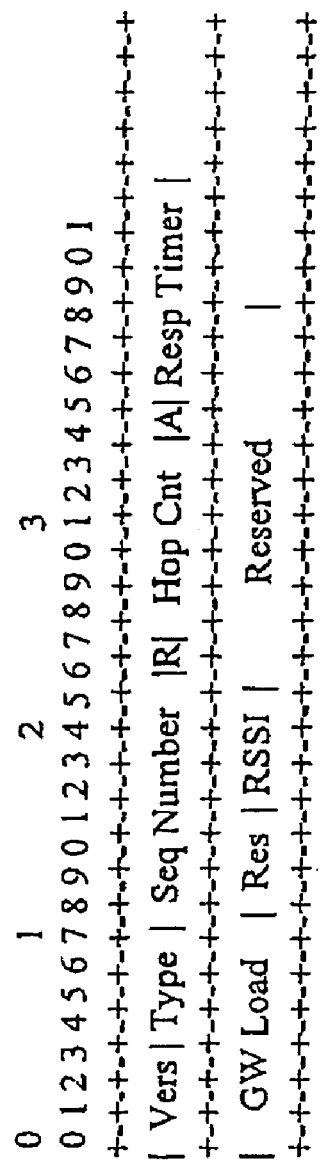
FIG. 4 illustrates an exemplary network discovery packet header, according to one embodiment.

ND messages are used for neighborhood detection and network discovery. FIG. 4 illustrates an exemplary network discovery packet header 400, according to one embodiment. The network discovery message header 400 contains the following fields:

| | |
|---|---|
| Vers | Version number. |
| Type | Type; 1 for ND, 2 for ND_ACK |
| Seq Number | Sequence number; filled in at the transmitter of the message, copied as such to acknowledgment. |
| Hop Cnt | Distance from the gateway 120 in number of hops. Set to 0 on NDs, filled with distance from gateway 120. Filled with 0x7f if no paths to gateway 120 exist. |
| A | All flag; set to 1 if everyone hearing this ND should acknowledge, 0 if duplicate acknowledgments should be suppressed. When suppression is requested, the acknowledgments are sent to broadcast address. |
| Resp Timer | Timer for sending acknowledgments. Value is in seconds, 0 means no ack necessary. |

| | |
|---|---|
| GW Load | Represents the load of a gateway 120; set to 0 by transmitter of ND, in ND_ACK filled with the latest 'GW load' number received from the gateway 120 either via NREG_ACK, or RUPD. Filled with 0xfe if no info available. |
| RSSI | Set to 0 when sending this message, filled with RSSI of received ND in acknowledgment. |

Nodes 130, 140 limit the rate at which they send out ND messages. The Resp Timer field is filled in by the transmitter of the ND recipient. It indicates the time window within which the ND_ACK 400 is sent by the recipient. It is set to 'Fast ND Time' during fast channel scan, and to 'Slow ND Time' during neighbor list gathering.

Neighbour Discovery and Maintenance

Periodic HELLOs—Map of the network 100 is maintained using HELLO protocol and passive monitoring of traffic. CPDs 140 and gateways 120 periodically broadcast HELLO messages, which are used by neighbors to collect link quality information. Periodic HELLOs are sent at the TX power indicated for this node by the gateway 120 in route update (RUPD) messages. If this node has not received route update (RUPD) messages, it uses either configured TX power value, or maximum TX power setting. Periodic HELLOs are sent once per 'HELLO Interval'.

Passive Scanning

A node ascertains the presence of a neighbor by the traffic it receives, specifically:
  HELLO messages periodically sent from that neighbor.
  Unicast traffic directed to any node sent from that neighbor.
  Broadcast traffic from that neighbor.

According to one embodiment, messages originating from nodes which are in the process of network discovery do not reset next hop aging.

Neighbour Table Maintenance and Active Scanning

Node assumes that it has lost connectivity to its neighbor if it hasn't seen traffic from it for 'Link Max Idle Time' period of time. When this happens, neighbor is removed from node's neighbor table. Special case are the links to upstream nodes, if CPD 140 has not been able to receive any data from its upstream neighbor, this might be due to self-interference from traffic sent by other nodes in the network 100. Node 140 starts sending unicast HELLO messages to at least one upstream neighbor to validate that it is still present. This is started at 'Link Max Idle Time'/2 of idle time. Collected information is periodically sent to the gateway 120. If CPD 140 locally determines that all the upstream neighbors are down, it initiates neighbor discovery process in this channel. If no new route to gateway 120 is found, the node enters network discovery phase.

HELLO Message Format

FIG. 5 illustrates an exemplary HELLO message header 500, according to one embodiment. HELLO messages 500 are used for searching and/or reporting the presence of a link. The HELLO message header 500 contains following fields:

| | |
|---|---|
| Vers | Version number. |
| Type | Type; 3 for HELLO, 4 for HELLO_ACK |
| Seq Number | Sequence number; filled in at the transmitter of the message, copied as such to acknowledgment. |
| R | Route OK flag; set to 0 by transmitter of HELLO, in acknowledgment set to 1 if it's OK to use this neighbour to send neighbour List to gateway 120. |
| Hop Cnt | Distance from the gateway 120 in number of hops. Set to 0 on NDs, filled with distance from gateway 120. Filled with 0x7f if no paths to gateway 120 exist. |
| A | All flag; set to 1 if everyone hearing this HELLO should acknowledge, 0 if duplicate acknowledgments should be suppressed. When supression is requested, the acknowledgments are sent to broadcast address. |
| Resp Timer | Timer for sending acknowledgments. Value is in seconds, 0 means no ack necessary. |

Node Registration and Route Distribution

After the network discovery phase, there may be no valid route to gateway 120. In addition, gateway 120 does not know that the node 130, 140 is present. The node 130, 140 initially registers with the gateway 120 and periodically reports its presence to it.

In registration messages, a node 130, 140 advertises the network protocol it wants to use, e.g. IPv6. Gateway 120 rejects the registration if it is not capable of handling this protocol. Node 130, 140 registers itself by sending a Node Register message (NREG). If 'NREG retry count' number of registration attempts have not been successful, the node 130, 140 assumes that the gateway 120 is unreachable. In that case node 130, 140 re-enters network discovery phase.

The initial NREG messages are sent to a neighbor who claims in its ND_ACK to own a valid route to the gateway 120. If no such neighbor exists, or if the ack for this NREG fails to arrive, the discovery process is restarted after 'Network discovery interval' time period has elapsed. According to one embodiment, a node who is in process of doing network discovery, or whose route to gateway 120 includes the source of this HELLO as one of the path elements, does not claim that it has a valid route to gateway 120. The NREG message includes information about a node's 130, 140 immediate neighbors and this information is used by the gateway 120 to compute routes for this and other nodes in the network 100, and maintain a constantly updated node routing table for the network.

If the gateway 120 fails to receive NREG messages within 'Node Unreachable Time' it assumes the node 130, 140 has disappeared from the network 100. A sequence number is used for making sure that neighbor information from a node is not processed out-of-order. It is monotonically increasing, incremented according to rules of the lollipop model. Gateway 120 stores the previously seen NREG sequence number, and discards messages that arrive out-of-order. If gateway 120 responds to a periodic NREG message with NREG_ACK with 'N flag' set, CPD 140 slowly scans that channel again using full TX power, and reports all its neighbors. Also it re-registers all BPDs 130 who have associated with it.

Multiple messages are needed when the number of neighbors to report in NREG messages causes one to exceed link MTU size (1500 bytes). Nodes 130, 140 report all its neighbors during a registration, with a serial set of messages.

A node 130, 140 sends NREG messages one at a time, waiting for acknowledgments before sending another one. If the acknowledgment fails to arrive within 'NREG rexmit time', NREG message is retransmitted. After 'NREG rexmit count' number of failed attempts have been made with a single message, registration attempt is given up and retried after 'NREG interval'. A sequence number is incremented for every new message. 'More flag' is set in all but the last message of multipart NREG. Message number starts from zero, and is incremented by one for every message in split NREG report.

With multipart NREG messages, information about the most important neighbors is included in the first segment.

These are the nodes through which the NREG message is sent, and all the upstream neighbors of the node. Missing upstream neighbor entry in the first segment means that the node has lost connectivity to it, and that gateway 120 should not use it when sending NREG_ACKs. Gateway 120 updates its routing tables after the first segment has been sent, and also when all the parts of an NREG have been received.

Node Register Message Format

Figure 6:
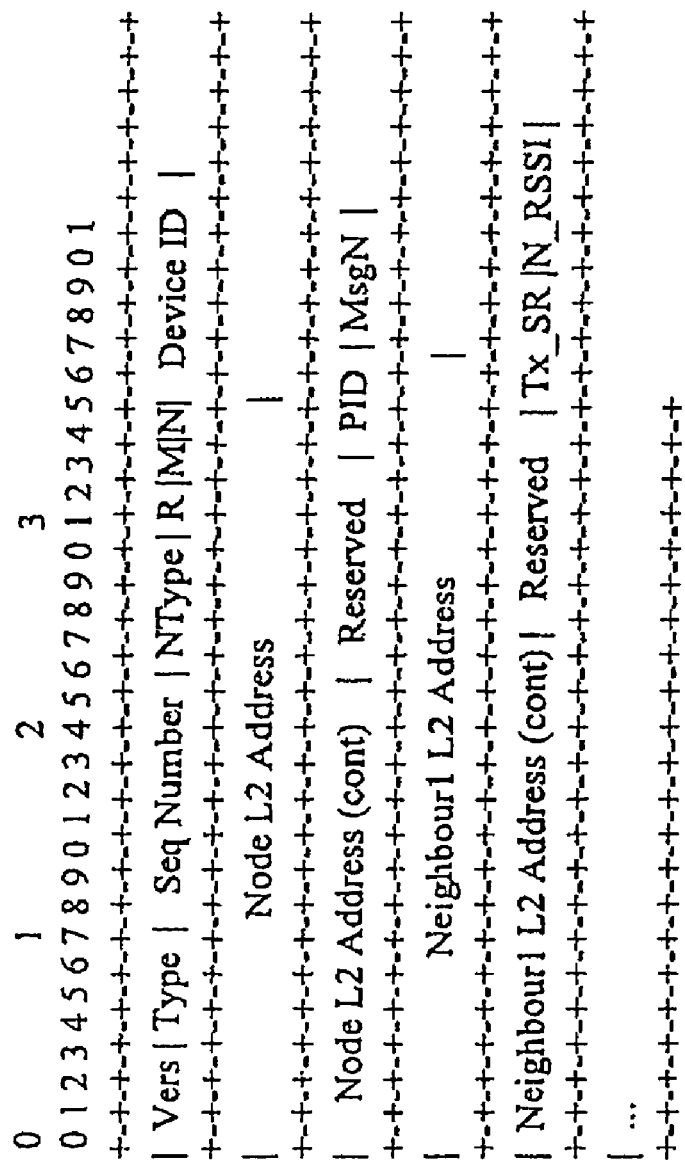
FIG. 6 illustrates an exemplary node registration message used when registering to a network, according to one embodiment.

FIG. 6 illustrates an exemplary NREG message 600 used when registering to a network 100, according to one embodiment. NREG message 600 is used to update the gateway's 120 map of the network 100. The NREG message header 600 contains following fields:

| | |
|---|---|
| Vers | Version number. |
| Type | Type; 5 for NREG. |
| Seq Number | Sequence number; filled in at the transmitter of NREG, copied as such to acknowledgment in NREG_ACK. |
| NType | Node type; 0 for CPD, 1 for BPD, 2 for CPD which has backup power through battery. |
| M | More flag; if multiple NREG messages are needed for reporting all the neighbours, this flag is set on all but last of these messages. |
| N | New registration flag; set in NREG if this message is being sent after a channel scan done using full TX power. Gateway 120 sets this in NREG_ACK if it hasn't seen this meter before. |
| Device ID | assigned device type identifier. 0x17 for GE KV2c electric meters, 0x08 for gas IMUs, 0x09 for water IMUs, 0x0B for relays. |
| Node L2 Address | Address of the node sending this registration. |
| PID | Proto ID; identifier for the network protocol used by this node. Valid IDs are IPv4 or IPv6. |
| MsgN | Message number; identifies the message in sequence when multiple NREG messages are used for registration. |
| Neighbour L2 Address | Address of neighbor. A neighbor can appear multiple times in this array. |
| Tx_SR | Transmit success rate; this reports the ratio of successful transmissions compared against all transmit attempts. Value is from 0 to 15. |
| N_RSSI | RSSI of the received messages. |

Per neighbor information (L2 address and RSSI) is sent for every neighbor. Size of the packet is used in determining how many are being reported by this node. Nodes should limit the rate at which they send out NREG messages 600. An NREG message 600 sent for a BPD 130 contains only a single neighbor, this is the entry for CPD 140 it has selected as its master.

Node Register Acknowledgment Message Format

FIG. 7 illustrates an exemplary NREG_ACK message 700 sent in response to NREG message, according to one embodiment. The NREG_ACK message header 700 contains following fields:

| | |
|---|---|
| Vers | Version number. |
| Type | Type; 6 for NREG_ACK. |
| Seq Number | Sequence number; copied from NREG. |
| GW Load | Represents the load of a gateway 120. Set to current load of gateway 120 on RUPD, ignored on RUPD_ACK. (RUPD refers to Route Update Message) |

Nodes 130, 140 update their current TX power setting each time they receive RUPD, NREG_ACK messages. Sending a NREG_ACK with gw load 0xff commands the node to leave the current network and restart network discovery.

Route Calculation and Distribution

Route distribution is done to CPDs 140. Routes are sent to a node 140 via route update (RUPD) messages. These messages contain up to 3 full node-gateway 120 paths via different upstream neighbors. Gateway 120 recalculates routes:
 periodically at every 'Route Calculation Interval',
 when a node reports in NREG that all its upstream neighbors are unreachable.

Route calculation is done using shortest path first, and a single path is selected. Multiple paths are calculated, and optimized transmit power settings for each CPD are provided. A sequence number is used for making sure that path information from the gateway 120 is not processed out-of-order. In gateway 120, the path information is stored per destination, and incremented. Gateway 120 includes additional configuration information in RUPD. Gateway 120 limits the rate at which it sends RUPD messages to optimum functional levels.

Route Update (RUPD) Message Format

FIG. 8 illustrates an exemplary route update message 800 sent by gateway 120 to update settings for a CPD 140 node, according to one embodiment. RUPD messages 800 contains following fields:

| | |
|---|---|
| Vers | Version number. |
| Type | Type; 7 for RUPD. |
| Seq Number | Sequence number; assigned for RUPD, copied as such to RUPD_ACK. |
| TXPwr | Transmit power which should be used for regular communication by this node. |
| PC | Path count; number of paths included in this message. |
| GW Load | Represents the load of a gateway 120. Set to current load of gateway 120 on RUPD, ignored on RUPD_ACK. |

Nodes 130, 140 update their TX power setting with the latest transmit power information from gateway 120, each time they receive RUPD messages 600. Paths lists are optional. Node's current paths are replaced if paths are included in the latest RUPD message. Path descriptors are padded to 4 byte alignment. Path elements are in order from the node 130, 140 towards gateway 120; the address of the node 130, 140 and the gateway 120 are excluded from the list. Path metric indicates goodness of the path. RUPD messages use lollipop sequence numbering. Sending a RUPD with gw load 0xff commands the node to leave the current network and restart network discovery.

Route Update Acknowledgment (RUPD_ACK) Message Format

FIG. 9 illustrates an exemplary route update acknowledgement message 900, according to one embodiment. RUPD_ACK messages 900 contains following fields:

| | |
|---|---|
| Vers | Version number. |
| Type | Type; 8 for RUPD_ACK. |
| Seq Number | Sequence number; assigned for RUPD, copied as such to RUPD_ACK. |
| Status | Status of RUPD processing; set to 0 on success, and to nonzero on failure. If node returns an error, path information has been accepted, but not the configuration info. Error codes: 0 - Success 1 - Unrecognized Parameter 2 - Invalid Parameter Value |

Lollipop Sequence Numbering in RUPD

Sequence number assignment in RUPD messages follows lollipop model. Gateway 120 maintains for each CPD node 140 in the network 100 a monotonically increasing sequence number. When talking to a node for the first time, the sequence number is set to 0xff. Subsequent changes in message contents increment this value; i.e. changes in path list, TX power or GW Load. When the number reaches 0xfe, the next value that gets set is 0x00. Nodes should only allow route and configuration settings updates where sequence number of the message is larger than in the previous message. Gateway 120 does not roll this number over when none of its RUPD messages have been updated for a long time (i.e. difference between assigned sequence number and acknowledged sequence number must never grow to be larger than $2^7-1$.) If it does, sequence numbers are restarted from 0xff.

The same scheme applies to NREG sequence numbers. When a device 130, 140 talks to a gateway 120 for the first time after deciding to join a network, it starts its sequence numbers with 0xff. This is not incremented until NREG_ACK for it has been received. After this, sequence number is incremented each time node sends an NREG.

Route Update Additional Configuration Items

Gateway 120 distributes configuration variables in RUPD messages. These variable values are reset when a node 130, 140 restarts network discovery. Information in subsequent RUPD messages overwrites the previous setting. This is used in providing stateless autoconfiguration of network protocols.

Battery Powered Devices

BPD 130 discovers gateway 120 the same way as a CPD 140. After it has elected a network, it goes back to that channel, and elects one of the nodes who acknowledges its 2nd HELLO as its master, and sends a unicasted associate message to it. When multiple CPDs 140 ack this HELLO message, they are ranked based on RSSI and number of currently registered BPDs 130. If the CPD 140 sends a NAK (e.g. due to not enough resources), the 2nd best device is tried and so on. If none of the devices is capable of handling this BPD 130, channel scan continues. If association is successful, CPD 140 registers this BPD 130 with the networks 100 gateway 120. CPD 140 remembers BPDs 130 which have associated with it, and if it changes gateways 120, or if it determines that the gateway 120 has lost its state (N flag set in NREG_ACK), it re-registers all its BPDs.

Routing Components

The protocol described above does not allow nodes to migrate from one network to another network, unless connectivity to a gateway 120, or its upstream neighbors have been severed. According to another embodiment, a full channel scan periodically occurs to see if one can find new networks. Having a large number of nodes migrate changes the gwload component quite a bit, which could cause that same node to migrate back to original channel very soon, as it determines its original network is functionally superior to the one it had migrated to.

Accordingly, when nodes move over from their primary route to secondary route, it is possible that the packets will end up in a routing loop. If sending packets on secondary/tertiary path, the full path to gateway 120 is included in the packet. If gateway 120 fails, it might take quite a while for all nodes to migrate to a new channel. This could be made faster, if a node 130, 140 after discovering a new, functional network 100 returns to its old channel and broadcasts a message to its immediate neighbors saying that its about to move out. Neighbors then mark this neighbor unreachable immediately, and restart network discovery.

In case of a power outage, a lot of nodes 130, 140 become active at the same time. To alleviate the flurry of network discovery messages this generates, nodes 130, 140 store network info in persistent storage. If paths change due to NREG arriving to a gateway 120, it sends out an NREG_ACK, and an RUPD, which in turn is acknowledged by the node doing registration. Optimization includes path information along with NREG_ACK. This contains a sequence number from the same space as route updates, Otherwise path updates could be reordered.

Network Protocol

Conceptually, LAN forms an NBMA (non-broadcast-multiple-access) network. Multicast, and broadcast transmissions are possible, but the transmission has to be routed through the central node 120. Router advertisement, router solicitation, and redirect messages are supported. CPDs 140 and BPDs 130 process routing headers when they are the final destination, and return errors if the processing of the routing header requires them to forward the packet to another node. This ensures that the nodes are not inappropriately used in relaying packets to the greater Internet, or as components in DoS attacks.

Stateless Address Autoconfiguration

An EUI-64 identifier is constructed from link layer addresses similarly as to how it is done for Ethernet interfaces. The first 3 octets of the MAC address are followed by FFFE and the last 3 octets of the MAC address. RUPD messages contain an additional network prefix, and nodes generate their address from this by appending the interface identifier to this prefix.

Neighbor Cache

An IPv6 neighbor cache contains entries for nodes which are on-link as indicated by a network prefix of the address for a shared link. These might not be directly reachable, given that this is a multihop network. Definition of a neighbor in IPv6 is different from what it is at the link layer. IPv6 neighbor caches contain entries where the link layer destination is either a single address, or an array of link layer addresses. The array is for source-routing the packet through the network 100, and contains addresses of all intermediate hops. Entries will be added as a result of receiving RUPD messages from a gateway 120 or with ICMP Redirects.

Address Resolution and Nexthop Selection

Nexthop selection for a node is done by first consulting a neighbor cache for a matching entry. If no such entry exists, a link layer neighbor list is consulted. IPv6 addresses for nodes which are reachable directly from this node are constructed based on their MAC address. If the route to destination is still not found, the packet is sent to the gateway 120. Gateway 120 responds with ICMP Redirect if the destination is located in local network, or it forwards the packets on behalf of the source. Multicast traffic originated by these nodes is always sent directly to gateway 120.

Routing Optimization with RSSI Updates

In one embodiment described earlier, the RSSI (Received Signal Strength Indication) metric passed to the Gateway 120 in the NREG messages, as part of NREG message 600, is a 4 bit value that has a one to one mapping to a set of weights used for the SPF (Shortest Path First) calculation. A symbolic representation of the weighted metric is the following:

$$RSSI\{0,1,2,\ldots,15\} \rightarrow Weights\{a,b,c,\ldots,p\}$$

Any change in an RSSI value reported in a NREG message 600 would cause the routing program to update the stored value and trigger an SPF calculation, and could put burden on the computational resources of the Gateway 120. It could also flood the network with route updates. Further, it is neither desirable nor practical to have the Gateway 120 or the CPD 140 to engage in routing recalculations when RSSI values received change by small increments or decrements. To stabilize routing by optimizing the number of route recalculations without sacrificing performance, the invention presented herein introduces banding of RSSI values. RSSI values are divided into a chosen number of bands by mapping each RSSI value to a set of weights.

$$RSSI\{0,1,2,\ldots,13,14,15\} \rightarrow Weights\{(a,a,a)\ldots,(p,p,p)\}$$

The number of bands is a configurable parameter that can be modified to suit the network characteristics, such as network topology, traffic statistics, interference environment, etc.

In the current embodiment, and particularly of the banding scheme described above, a small change across the edge of an RSSI band can still trigger a route recalculation. Such small fluctuations can occur continuously in any link without any substantial change in the link quality. This condition could still trigger a series of recalculations or route flapping. To control such recalculations around the band edges, the current embodiment enables the setting of a threshold for the change in RSSI around the band edges that must be met in order to trigger a recalculation. In other words, if the change is within the upper and lower control limits (UCL and LCL) around the band edge, a route recalculation will not be triggered. UCL and LCL are defined as:

UCL=Measured RSSI+delta

LCL=Measured RSSI−delta

The exponentially smoothed RSSI calculated from received data is close to the Real Mean RSSI, and is therefore a good estimate of the link cost. A fresh calculation of the smoothed RSSI is needed when it starts diverging significantly from the Real Mean RSSI. In this embodiment, an algorithm is presented to calculate when to initiate a fresh calculation of the smoothed RSSI. By using this technique, one will be able to obtain better estimation of the link cost and performance of routing calculations.

The measured RSSI can be expected to vary between an upper and lower RSSI value, given the expected RSSI (Real Mean) distribution i.e.

Lower Control Limit (LCL)<Real Mean RSSI<Upper Control Limit (UCL), and

LCL<Measured RSSI<UCL

A violation of this rule can happen when the measured RSSI is greater than the UCL or lower than the LCL. When a predetermined number of successive violations (N) happen, the Smoothed RSSI no longer equals the Real Mean RSSI. When this event is triggered, the old smoothed RSSI is dropped and a new smoothed RSSI from new data is calculated.

In the current embodiment, the value of N can be changed, allowing a trade off between response and false positives. In one embodiment, a configurable constant (delta) is utilized such that:

UCL=Mean RSSI+delta

LCL=Mean RSSI−delta where delta corresponds to a certain number of standard deviations from the sample. This technique simplifies computational complexity and route optimization response times.

Configurable Upper and Lower Bounds for RSSI

In one possible alternate embodiment a configurable parameter A is used to aid in determining whether it is preferable to calculate a new Accepted RSSI, The Accepted RSSI is the value used to represent the true RSSI between two nodes I the network for purposes of link cost calculation and routing decisions. An Accepted RSSI may be calculated by different formulas or algorithms. For example, the Accepted RSSI may be calculated as the mean RSSI (i.e. arithmetic mean). Alternatively, the accepted RSSI may be calculated using a smoothing function. For example the smoothed RSSI calculated from received data, $S_t$, the smoothed RSSI for any time period t, is found by computing $$S_t = \alpha M_t + (1-\alpha)S_{t-1} \quad 0 < \alpha \leq 1, t=1,2,\ldots,n$$

This provides exponential smoothing where the parameter a is called the smoothing constant (or smoothing parameter) and $M_{t-1}$ is the measured or observed RSSI at time t. In this example embodiment the smoothing parameter is configurable, which allows the smoothing parameter to be selected (or varied), to suit the local characteristics of the network. In the presently preferred embodiment, the smoothing parameter is restricted to reciprocal powers of 2 to simplify binary calculations. However the Accepted RSSI is calculated, the assumption is that the Accepted RSSI is an accurate estimate of the link cost. In the event the Accepted RSSI is not an accurate estimate of link cost, then it is preferable to calculate a new Accepted RSSI.

In one possible embodiment a determination of whether to calculate a new Accepted RSSI may be made by comparing the measured RSSI to an upper control limit and a lower control limit to determine whether the measured RSSI is within an expected (or acceptable) range. In the presently preferred embodiment, the upper control limit (UCL) and lower control limit (LCL) are:

UCL=Accepted RSSI+Δ

LCL=Accepted RSSI−Δ where Δ is a configurable control limit parameter. In the presently preferred embodiment, the configurable control limit parameter is used for both the UCL and LCL calculations. However, alternate embodiments could use different control limit parameters for the upper control limit or for the lower control limit. In yet another possible embodiment, a configurable upper control limit parameter may be used in conjunction with a calculated lower control limit parameter, or a configurable lower control limit parameter may be used in conjunction with a calculated upper control limit parameter.

Figure 10:
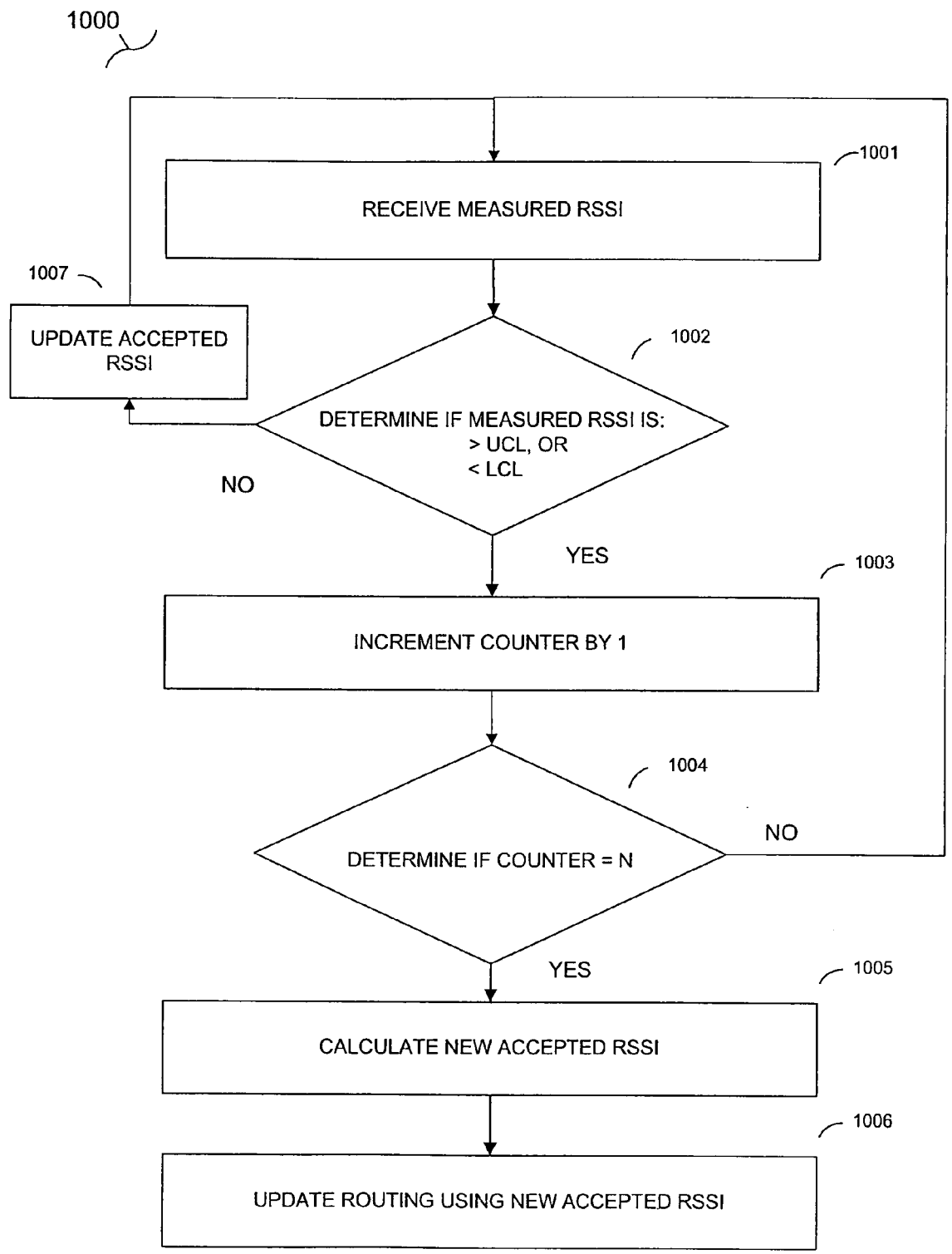
FIG. 10 is a generalized flow diagram illustrating a process for determining when to calculate a new accepted received signal strength parameter, according one possible embodiment.

A process is presented to determine when to initiate a fresh calculation of the Accepted RSSI as shown in FIG. 10. Thus, a new Accepted RSSI may be calculated by using this technique, allowing better estimation of the link cost and performance of routing calculations.

Referring now to FIG. 10, at step 1001 measured real signal strength is received. In the presently preferred embodiment, this measured real signal strength information corresponds to a neighboring node, for example a meter or other electronic device as may be found in a utility network. At step 1002 a determination is made whether the measured real signal strength is either above an upper control limit, or if the measured real signal strength is below a lower control limit. In the event the measured real signal strength is either above the upper control limit or below the lower control limit, the system proceeds to step 1003 where an out of bound counter is incremented. In the presently preferred embodiment, at step 1004 a determination is made whether there have been an unacceptable number of measured real signal strengths above the upper control limit or below the lower control limit. At step 1004 the out of bound counter is compared to an out of bound incidence limit N. If the out of bound counter is equal to N (or above N) the system proceeds to step 1005 where a new Accepted RSSI is calculated. It may be said that the out of bound counter violates the out of bounds incidence limit N if the out of bound counter is equal to N (or is above N). In one preferred embodiment, the value of N may be changed (for example, N may be configured), allowing a trade off between response time and false positives. In the event at step 1002 the measured real signal strength is within the upper control limit and the lower control limit, at step 1007 the measured real signal strength may be used to update the Accepted RSSI. Additionally, at step 1007 the out of bound counter may be reset to zero.

Calculation of the new Accepted real signal strength may involve calculating a mean, for example using the last N measured real signal strengths, or may involve a smoothing function. In one preferred embodiment, the new Accepted real signal strength is equal to the last measured real signal strength.

The new Accepted real signal strength (or new calculated real signal strength) is preferably used to update the routing to one or more nodes in the network at step 1004. In one possible embodiment, the updated routing information is transmitted to other nodes within the network (with or without the new Accepted RSSI), for example to a gateway device within the network. In another possible embodiment, the new Accepted RSSI is transmitted to one or more nodes in the network, and one or more of the receiving nodes may update routing information based upon the new Accepted RSSI. The receiving nodes may forward the new Accepted RSSI, may forward updated routing information, or may not forward RSSI or routing information (or both).

| Configuration Parameters | |
|---|---|
| Default TTL | TTL value in link layer header. Default: 8, min 2, max 64. |
| Fast ND Time | How much response time is given in ND used for discovering network. Default: 1 second, min 1 sec, max 127 sec. |
| Slow ND Time | How much response time is given in ND used for discovering neighbors. Default: 10 seconds, min 1 sec, max 127 sec. |
| HELLO Interval | How frequently nodes should broadcast HELLO messages after registration. One must add randomness to sending these, random component should be +−⅓ of period. Default: 360 seconds, min 10 sec, max 7200 sec. |
| Link Max Idle Time | If no packets are received from a neighbor during this time period, it is determined that it's not there anymore. Default: 5 * HELLO interval, min 3 * HELLO interval, max 10 * HELLO interval. |
| NREG Interval | How frequently nodes should send their updated list of neighbors to the gateway 120. One must add randomness to sending these, random component should be +−⅓ of period. Default: 240 minutes, min 10 mins, max 3600 minutes. |
| NREG Retry Count | How many times a node attempts registration before determining that gateway 120 is down, and that it should start searching from other channels. Default: 2, min 1, max 15. |
| NREG Rexmit Count | How many times a node transmits NREG before giving up on this registration attempt. Default: 3, min 2, max 15. |

-continued

| Configuration Parameters | |
|---|---|
| NREG Rexmit Time | How long node waits for NREG_ACK after sending NREG before trying retransmit, or giving up. Default: 10 secs, min 3 secs, max 60 secs. |
| Network discovery interval | If no network has been found, this is how long node must sleep (wait) before restarting channel scan. Random component must be added to sleep, it should be +−⅓ of period. Default: 60 minutes, min 10 min, max 3600 mins. |
| Node Unreachable Time | How long the gateway 120 has to be missing NREG messages from a node before deciding that it has disappeared from the network. Default: 6 * NREG interval, min 4 * NREG interval, max 64 * NREG interval. |
| Node Dead Time | How long the gateway 120 has to be missing NREG messages from a node before clearing state about the node. Default: 64 * NREG interval, min 24 * NREG interval, max never. |
| Route Calculation Interval | How frequently gateway 120 recalculates routes for the network. |

Although the present method and system have been described in connection with a utility management and distribution systems, one of ordinary skill would understand that the techniques described may be used in any situation where it is to effectively manage and organize various utilities.

A method and system for providing a network protocol for utility services have been disclosed. Although the present methods and systems have been described with respect to specific examples and subsystems, it will be apparent to those of ordinary skill in the art that it is not limited to these specific examples or subsystems but extends to other embodiments as well.

Although the present method and system have been described in connection with a utility management and distribution systems, one of ordinary skill would understand that the techniques described may be used in any situation where it is to effectively manage and organize various other types of devices deployed to monitor and register any type of information originating at the location where each device, CPD 130, BPD 140 is deployed.

We claim:

1. A computer implemented method, comprising:
receiving measured received signal strength from at least one node in a wireless network;
determining whether the measured received signal strength is either greater than an upper control limit or below a lower control limit;
in the event the determination is that the measured received signal strength is either greater than an upper control limit or below a lower control limit, determining whether the number of measured real signal strengths, which are greater than the upper control limit or below the lower control limit, violates an out of bound incidence limit; and
in the event the determination is that number of measured real signal strengths above an upper control limit or below a lower control limit violates an out of bound incidence limit, calculating an accepted received signal strength,
wherein the upper control limit=accepted received signal strength+configurable control limit parameter,
wherein the lower control limit=accepted received signal strength−configurable control limit parameter; and wherein the method further comprises updating routing information based on the new accepted received signal strength.

2. The computer implemented method of claim 1, wherein the calculation of a new accepted real signal strength includes setting the new accepted real signal strength equal to the last measured real signal strength.

3. The computer implemented method of claim 1, wherein calculation of a new accepted real signal strength includes using a smoothing function.

4. The computer implemented method of claim 1, wherein the out of bound incidence limit is configurable.

5. The computer implemented method of claim 1, wherein the determination that number of measured real signal strengths above an upper control limit or below a lower control limit violates an out of bound incidence limit is includes comparing the out of bound incidence limit to an out of bound counter.

6. The computer implemented method of claim 5, wherein the out of bound counter is reset when a determination is made that the measured received signal strength is both less than an upper control limit and greater than a lower control limit.

7. The computer implemented method of claim 5, further comprising: transmitting the new accepted received signal strength to at least one other node in the network.

8. The computer implemented method of claim 1, further comprising:
transmitting the updated routing information to at least one other node in the network.

9. A method of updating routing information among nodes in a utility network, comprising:
measuring a received signal strength from at least one neighboring node in a wireless network;
determining whether the measured received signal strength is outside of a real signal strength accepted range, the real signal strength accepted range being defined by an upper control limit and a lower control limit;
in the event the determination is that the measured received signal strength is outside of an accepted range, determining whether the number of measured real signal strengths outside of an accepted range exceeds an out of bound incidence limit; and
in the event the determination is that number of measured real signal strengths outside of an accepted range exceeds an out of bound incidence limit, calculating a new accepted received signal strength;
wherein the upper control limit=accepted received signal strength+configurable upper control limit parameter,
wherein the lower control limit=accepted received signal strength−configurable lower control limit parameter, and
wherein the method further comprises calculating a new link cost based upon the new accepted real signal strength.

10. The method of claim 9, wherein the upper control limit parameter is equal to the lower control limit parameter.

11. The method of claim 9, wherein the out of bound incidence limit is a configurable parameter.

12. The method of claim 11, wherein an out of bounds incidence counter is used to determine whether the out of bound incidence limit has been exceeded.

13. The method of claim 12, wherein the out of bounds incidence counter is reset when there is a determination that the measured real signal strength is within the real signal strength accepted range.

14. The method of claim 9, further comprising:
transmitting the new link cost to at least one other node in the utility network.

15. The method of claim 14, further comprising:
receiving the transmitted new link cost; and
updating routing information according to the received new link cost.

16. A computer implemented method, comprising:
setting an acceptable range for a received signal strength;
determining whether a measured received signal strength for a signal sent between two nodes in a network is within the set acceptable range;
in the event the measured received signal strength is not within the set acceptable range, determining whether there have been an unacceptable number of measured received signal strengths not within the set acceptable range;
in the event there have been an unacceptable number of measured received signal strengths not within the set acceptable range, determining a new accepted received signal strength that is based upon at least one measured received signal strength and setting a new acceptable range based at least in part on the new accepted received signal strength; and
in response to the determination of the new accepted received signal strength, updating routing information according to the new accepted received signal strength.

17. The computer implemented method of claim 16, wherein the unacceptable number of measured received signal strengths is settable.

18. The computer implemented method of claim 16, wherein the new accepted received signal strength is set equal to the most recent measured received signal strength.

19. The computer implemented method of claim 16, wherein the new accepted received signal strength is calculated on the basis of a plurality of measured received signal strengths.

20. The computer implemented method of claim 19, wherein said calculation is performed in accordance with a smoothing function.

21. The computer implemented method of claim 16, further including the step of transmitting the updated routing information to at least one node in the network.

* * * * *